(12) United States Patent
Bordawekar et al.

(10) Patent No.: US 10,025,773 B2
(45) Date of Patent: Jul. 17, 2018

(54) SYSTEM AND METHOD FOR NATURAL LANGUAGE PROCESSING USING SYNTHETIC TEXT

(71) Applicant: INTERNATIONAL BUSINESS MACHINES CORPORATION, Armonk, NY (US)

(72) Inventors: Rajesh Ramkrishna Bordawekar, Yorktown Heights, NY (US); Oded Shmueli, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 54 days.

(21) Appl. No.: 14/809,001

(22) Filed: Jul. 24, 2015

(65) Prior Publication Data

US 2017/0024466 A1    Jan. 26, 2017

(51) Int. Cl.
*G10L 19/038* (2013.01)
*G06F 17/28* (2006.01)
*G06F 17/27* (2006.01)

(52) U.S. Cl.
CPC .......... *G06F 17/276* (2013.01); *G06F 17/277* (2013.01); *G06F 17/2715* (2013.01); *G06F 17/2881* (2013.01)

(58) Field of Classification Search
CPC .......... G06K 9/00483; G06K 9/00463; G06K 9/4676; G06K 9/6228; G06K 9/6232; G06K 9/6277; G06F 17/27; G06F 17/274; G06F 17/2775; G06F 17/30663; G06F 17/3071; G06F 17/2765; G06F 17/2785; G06F 17/30598; G06F 17/30705; G06F 19/707

USPC ..... 704/1–10, 270, 235, 275, 222, 237, 251, 704/257, 258
See application file for complete search history.

(56) References Cited

U.S. PATENT DOCUMENTS

| 8,812,301 B2 | 8/2014 | Brun et al. |
| 2003/0005258 A1* | 1/2003 | Modha ............... G06K 9/6223 712/1 |

(Continued)

FOREIGN PATENT DOCUMENTS

EP    1 378 838    10/2005

OTHER PUBLICATIONS

Bai Xue, et al., "A Study on Sentiment Computing and Classification of Sina Weibo With WORD2vec," 2014 IEEE International Congress on Big Data, pp. 358-363.

*Primary Examiner* — Chan S Park
*Assistant Examiner* — Stephen M Brinich
(74) *Attorney, Agent, or Firm* — F. Chau & Associates, LLC.

(57) ABSTRACT

A method for performing natural language processing includes receiving a primary text file. The received primary text file is scanned to determine a set of statistics related to a frequency at which various words of the primary text file follow other words of the primary text file. A probabilistic word generator is created based on the determined set of statistics. The probabilistic word generator generates synthetic text exhibiting the determined set of statistics. Synthetic text exhibiting the determined set of statistics is generated using the created probabilistic word generator. Word vectorization is performed on the synthetic text. Results of the performed vectorization are used to perform machine learning tasks.

19 Claims, 5 Drawing Sheets

(56) References Cited

U.S. PATENT DOCUMENTS

| | | | |
|---|---|---|---|
| 2004/0024598 A1* | 2/2004 | Srivastava | G10L 25/78 704/235 |
| 2004/0175687 A1* | 9/2004 | Burstein | G06F 17/27 434/353 |
| 2005/0071152 A1* | 3/2005 | Morimoto | G06F 17/2765 704/10 |
| 2012/0197631 A1* | 8/2012 | Ramani | G06F 17/2755 704/9 |
| 2014/0129227 A1 | 5/2014 | Hagg et al. | |
| 2014/0278435 A1 | 9/2014 | Ganong, III et al. | |
| 2014/0337355 A1 | 11/2014 | Heinze | |
| 2014/0365207 A1 | 12/2014 | Convertino et al. | |
| 2015/0019203 A1 | 1/2015 | Smith et al. | |

* cited by examiner

SYSTEM AND METHOD FOR NATURAL LANGUAGE PROCESSING USING SYNTHETIC TEXT

BACKGROUND

1. Technical Field

The present disclosure relates to natural language processing (NLP) and, more specifically, to systems and methods for performing NLP using synthetic text.

2. Discussion of Related Art

Natural language processing (NLP) is the science of using machines to understand and/or communicate in the ordinary languages of humans. One way in which NLP may be performed is by analyzing a body of text ("corpus") using machine learning so that each word of the body of text may be understood in its proper context. For example, the body of text may be analyzed so as to assign a vector to each word that is present within the body of text. This vector may be used to interpret the manner in which each word is used in relation to other words. Once each word has been assigned a vector, or vectors, one or more machine learning tool, e.g. deep learning net, may be applied to the resulting vectors to provide an understanding of natural language.

One popular tool for analyzing a text corpus and assigning vectors to the words therein is "word2vec" which is developed and published by Google Inc. Word2vec is a neural network-inspired tool that learns distributed representations for words consisting of 2 vectors for each relevant vocabulary word. Given a sufficiently large text corpus, word2vec can be used to learn the meaning and use of words based on their appearances within the text corpus. By understanding the meaning and use of words, machines may be used to solve word analogies such as, "king is to man as a queen is to what?" or to cluster documents and classify them by topic. The ability to cluster documents in this way has relevance in the fields of search sentiment analysis, and recommendations.

One problem with the use of vector assignment tools such as word2vec is that it is very computationally expensive and time consuming to analyze a text corpus of adequate size. While advances in hardware will certainly help to mitigate the time needed to perform such an analysis, modern advances in hardware are often focused on parallel processing and analysis of large text corpora using tools such as word2vec are not well suited for exploiting parallel processing. Moreover, because the large text corpus must be read from relatively slow memory as it is analyzed, these memory read operations significantly slow down the process of text analysis.

BRIEF SUMMARY

A method for performing natural language processing includes receiving a primary text file. The received primary text file is scanned to determine a set of statistics related to a frequency at which various words of the primary text file follow other words of the primary text file. A probabilistic word generator is created based on the determined set of statistics. The probabilistic word generator generates synthetic text exhibiting the determined set of statistics. Synthetic text exhibiting the determined set of statistics is generated using the created probabilistic word generator. Word vectorization is performed on the synthetic text. Results of the performed vectorization are used to perform machine learning tasks.

A method for word vectorization includes receiving a primary text file. All words included in the primary text file are listed. A unique integer is assigned to each of the listed words. A secondary file is created to include the words of the primary text file, in their original order, having been replaced by their assigned unique integer. Word vectorization is performed on the secondary file.

A computer system includes a processor and a non-transitory, tangible, program storage medium, readable by the computer system, embodying a program of instructions executable by the processor to perform method steps for word vectorization. The method includes receiving a primary text file. The received primary text file is scanned to determine a set of statistics related to the frequency with which various words of the primary text file follow other words of the primary text file. A probabilistic word generator is created based on the determined set of statistics. The probabilistic word generator generates synthetic text exhibiting the determined set of statistics. Synthetic text exhibiting the determined set of statistics is generated using the created probabilistic word generator. Word vectorization is performed on the synthetic text, as it is generated.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention seek to provide systems and methods for performing analysis on a text corpus using a tool such as Word2text in a way that is better able to exploit the power of parallel processing while significantly reducing I/O associated with reading the text corpus. For example, exemplary embodiments of the present invention may utilize the processing power of a graphical processing unit (GPU) to analyze a text corpus so as to assign a vector to each word thereof.

Exemplary embodiments of the present invention may reduce time spent on the reading of the actual text corpus from memory, in using a tool such as word2vec to perform vectorization for the words of the text corpus by analyzing text that has been synthetically generated, rather than analyzing the actual text corpus itself. For example, the text corpus may be scanned to understand the frequency for which one word follows another word and/or one or more words follow a multi-word phrase. Then, a probabilistic word generator may be used to generate words that conform to the statistical observations of the text corpus. These probabilistically generated words may then be used by the vectorization tool to assign one or more vectors to each word, rather than the actual text corpus itself, and in this way, the I/O demands may be substantially reduced and the process of vectorization may be significantly speed up.

Figure 1:
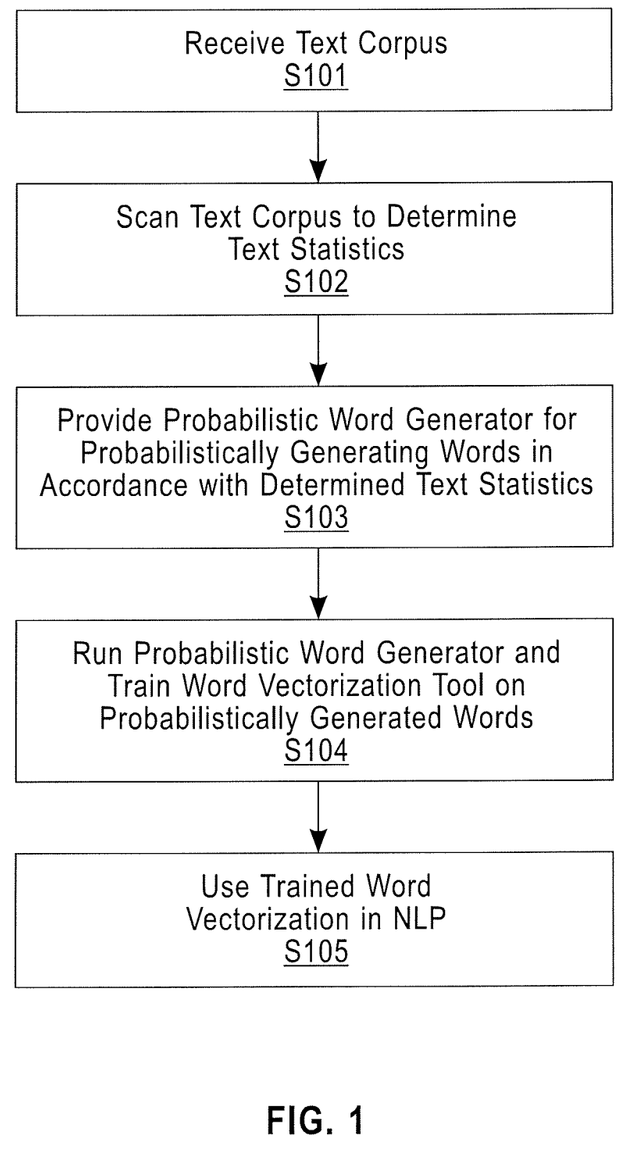
FIG. 1 is a flow chart illustrating a method for word vectorization in accordance with exemplary embodiments of the present invention.

FIG. 1 is a flow chart illustrating a method for word vectorization in accordance with exemplary embodiments of the present invention. First, a text corpus may be received (Step S101). The text corpus, as described above, may be any document or file including text. The text may be written in natural language and may serve as an example of proper usage of words in context. The text corpus may be very large, for example, including up to a few billion words. As the text corpus document or file may be very large, its receipt may include storing the document or file in secondary memory, such as on a hard disk drive (HDD) or a solid state drive (SSD).

The text corpus may then be scanned to derive a set of statistics characterizing the manner in which given words and phrases within the text corpus tend to follow other words and phrases therein (Step S102). This scanning of the text corpus may be a single initialization pass, as multiple passes may not be required. During the pass, each not-previously-read word may be recorded and a matrix M may be constructed having N rows and N columns, where N is the number of words in the text corpus. Each entry in the matrix M may be denoted as M[i][j] and may contain the number of occurrences of the word in the text corpus for the event E: "appearance of word #i is immediately followed by an appearance of word #j." Thus the matrix M can be used to capture the complete relationship as to how any given word tends to follow another given word. As the text corpus may be very large, the matrix M may have an exceedingly large number of entries and may be very sparse, as many words would simply never follow other words. During this pass, the total number of occurrences of each word within the text corpus may be counted. This number may be referred to as #w. Here #W may represent the total count of all words, and so #W is the sum of #w over all vocabulary words. The matrix M, along with the numbers #w and #W may be considered the text statistics, as they capture the nature in which words follow other words within the text corpus. However, the text statistics may include other information as well, such as the manner in which sets of words, or phrases, or sequences thereof are followed by other sets, or sequences, of words, or phrases.

Upon completing the scan of the text corpus and the assembling of the text statistics, a probabilistic word generator may be programmed to generate words probabilistically in accordance with the text statistics that were previously obtained from the scan (Step S103). The probabilistically generated words that emerge from the probabilistic word generator may be referred to herein as synthetic text, as the probabilistically generated words are not part of any actual document or file. Thus the synthetic text may have the same text statistics as the text corpus. For example, a given word may follow another word, within the synthetic text, with the same likelihood that the given word follows the another word in the text corpus.

The synthetic text may then be generated (Step S104). The synthetic text may be generated in "sentences" of a fixed length, which may be referred to herein as L. However, these sentences need not be real sentences that would be found in actual natural language text, but rather, these sentences are strings of words. The length L may be set and adjusted as a parameter and may be set to any value. For example, L=1000. Each sentence may begin by probabilistically selecting a starting word from among the complete set of words with a probability that is related to the frequency of the word within the set, e.g. proportional, where the probability of selecting any given word would be #w/#W, the total number of times a given word appeared in the text corpus over the length of the text corpus, in words. The starting word is therefore the first "output word" to be generated.

Once a starting word has been selected, successive words may be generated based on the probability of occurrence of a given word following the starting word. Here, the current output word a=word#a is represented by its word number–a, and J=the sum of all the occurrences of words as recorded in row a of M (note that J is approximately equal to #a). Denote by $j_1, \ldots, j_u$ the indexes of the non-zero entries of row a. A word with ordinal number $j_t$ may be chosen as the next output word with a probability $(M[a][j_t])/J$. Thus according to one exemplary embodiment of the present invention, rather than generating an actual word, what may be generated is an ordinal number representing a word, with each word having been assigned a unique ordinal number at the onset. Alternatively, the actual word may be generated in this step rather than an ordinal representation thereof. However, as the ordinal number may be a smaller chunk of data than the full word, the word vectorization tool, for example, word2vec, may operate more efficiently in assigning vectors to the ordinal representations, rather than the actual words themselves. In fact, during training word2vec continuously converts words to their ordinal representation as it scans text.

As the synthetic text is generated in Step S104, for example, directly to main memory, the vectorization tool may receive the synthetic text and perform vectorization thereupon. As the synthetic text is generated directly to main memory and the vectorization tool operates on the synthetic text right there in main memory, there are no time consuming I/O processes needed to grab text data from memory storage such as a hard disk drive (HDD) or a solid state drive (SSD). As the synthetic text is generated in these "sentences," the vectorization operating on each sentence may be a computational task assigned to a unique thread and the entire process of probabilistic word generation and vectorization may be implemented as a multi-threaded process, for example, with multiple threads being processed in parallel on multiple CPUs, CPU cores, and/or GPU cores, all accessing matrix M. Alternatively, or additionally, vectorization may be performed by a cluster of computers in communication with each other over a network.

The result of the probabilistic word generation/vectorization may be a set of vectors, one, two or conceivably more for each vocabulary word, or for example, for each ordinal value representing a word. These vectors may then be used in natural language processing (NLP) (Step S105).

Figure 2:
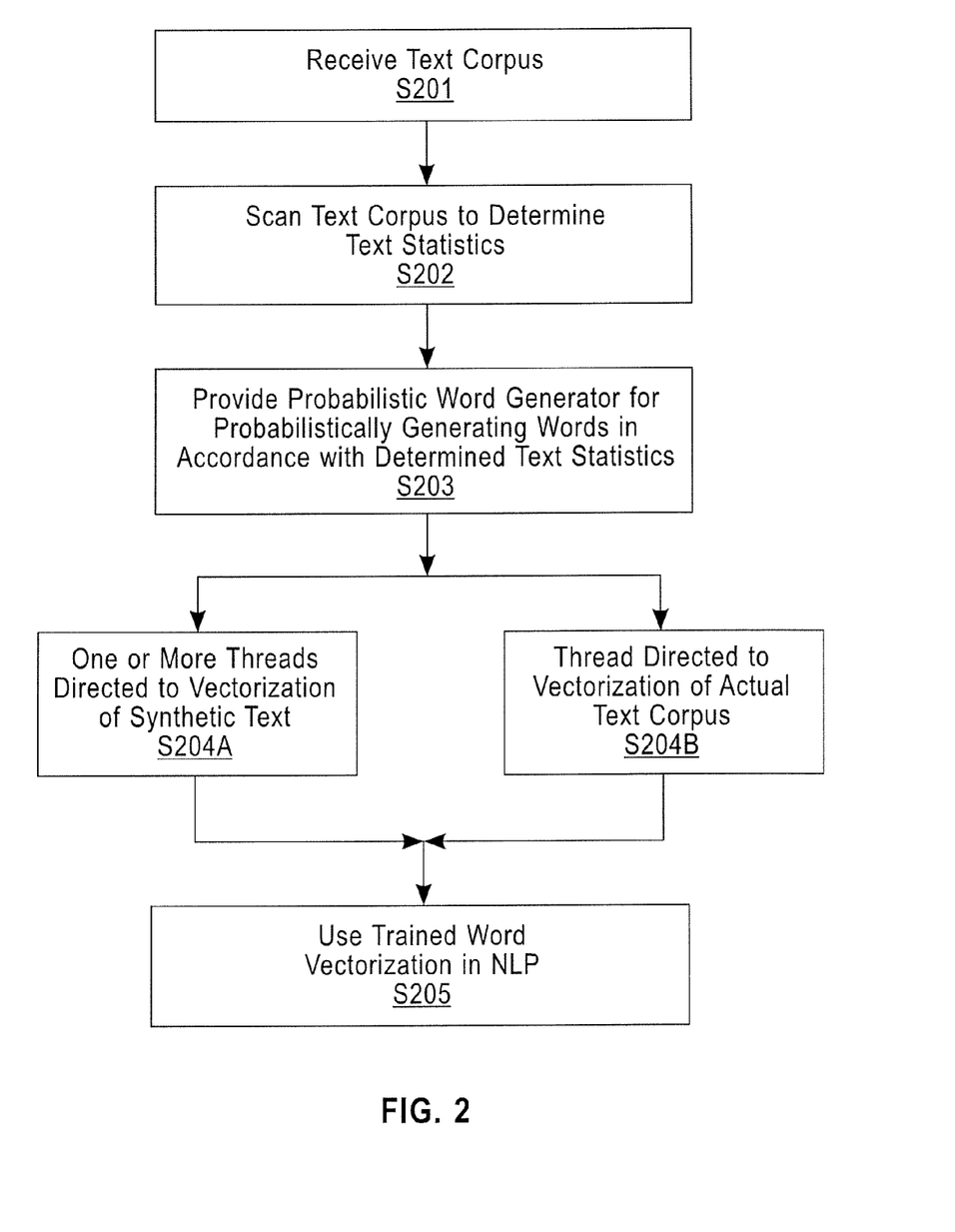
FIG. 2 is a flow chart illustrating an approach for performing word vectorization on a combination of synthetic and actual text corpus in accordance with exemplary embodiments of the present invention.

As vectorization is performed on probabilistically generated word sequences, in addition to the enhanced efficiency provided by reduced I/O, as discussed above, it is also the case that the probabilistically generated words and sentences may be used to improve vectorization training for as long as needed as the synthetic text has essentially no limit in size. However, to increase accuracy, exemplary embodiments of the present invention may perform vectorization on a combination of synthetic and actual text corpus. FIG. 2 is a flow chart illustrating an approach for performing word vectorization on a combination of synthetic and actual text corpus in accordance with exemplary embodiments of the present invention.

The text corpus may be received (Step S201). The text corpus may be scanned to determine text statistics, for example, as discussed in detail above (Step S202). Then, a probabilistic word generator may be provided to generate synthetic text that accords with the determined text statistics (Step S203). As before, multiple threads may be directed to vectorization of the synthetic text (Step S204A). However, additionally, there may be a processing thread directed to vectorization of the actual text corpus (Step S204B) or portions thereof and thus, the actual text corpus may be used in vectorization at substantially the same time as the synthetic text is vectorized. As the vectorization of the actual text corpus may take time to process, especially where multiple passes are performed, this time may be more efficiently put to use by simultaneously performing vectorization on similar synthetic text.

For example, according to some exemplary embodiments of the present invention, as the actual text corpus is loaded into main memory for vectorization, this time spent on I/O may be used for vectorization of synthetic text. In this way the "down time" associated with the actual text corpus I/O may be used for vectorization of synthetic text.

Moreover, it may be possible to fit the integer-replaced corpus, or a substantial part thereof, into primary memory (e.g. RAM), thereby reducing time spent reading the text corpus from secondary memory.

Figure 3:
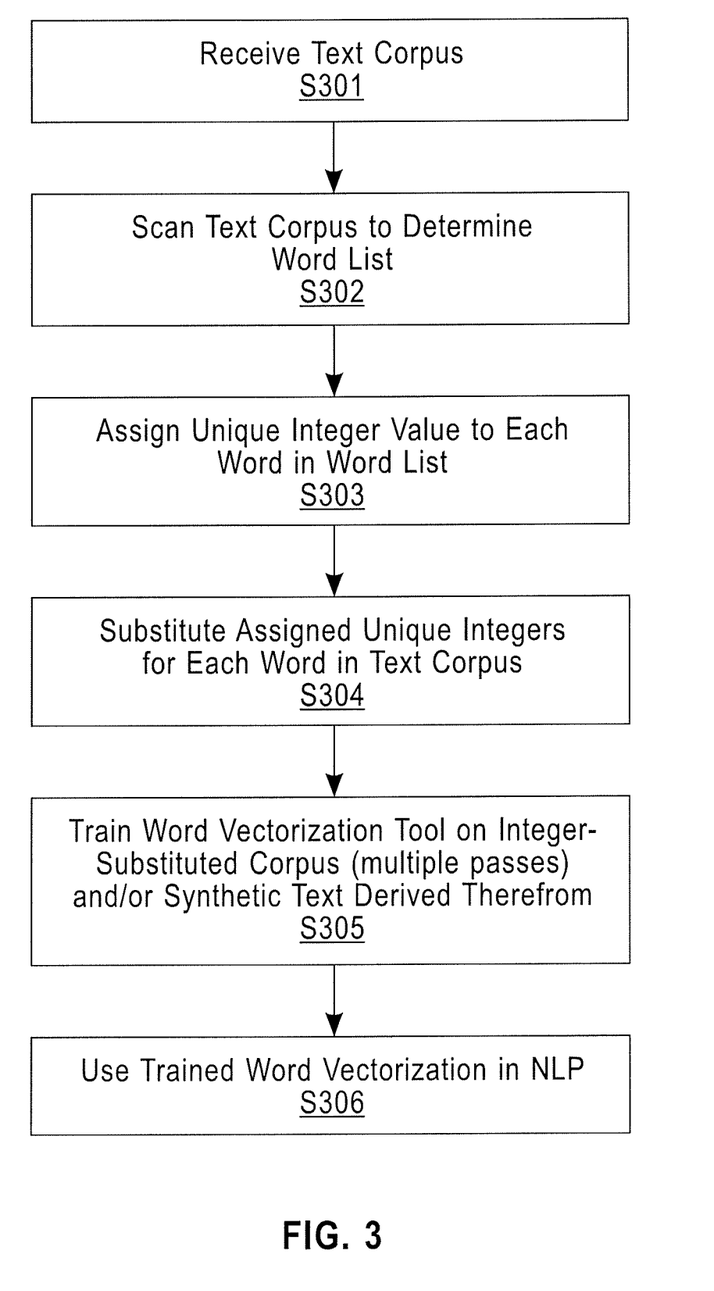
FIG. 3 is a flow chart illustrating an approach for word vectorization using representative integers in accordance with exemplary embodiments of the present invention.

As was explained above, to simplify the vectorization of the text, each word of the text may be assigned a unique ordinal number, such as an integer, and vectorization may be performed on the unique integer representation of words, rather than on the words directly. This may be the case for both the generation of the synthetic text as well as the vectorization on the actual text corpus. Where vectorization is performed on the actual text corpus, the representative integers may replace the corresponding words in the text corpus prior to vectorization thereupon. FIG. 3 is a flow chart illustrating an approach for word vectorization using representative integers in accordance with exemplary embodiments of the present invention. As described above, the text corpus may be received (Step S301). The text corpus may then be scanned to produce a library of unique words from therein (Step S302). A unique integer value may then be assigned to each word in the library (Step S303). A new corpus may be created by replacing each word of the text corpus with its assigned integer (Step S304). Word vectorization may thereafter be performed on the integer-replaced corpus (Step S305). Word vectorization thereupon may be repeated for multiple passes. As the integer-replaced corpus may be significantly smaller in size than the original text corpus, significant time savings and/or processing efficiencies may be realized. As discussed above, one or more sentences of synthetic text may be vectorized while the integer-replaced corpus is vectorized. While learning the distributed representation, different weight in terms of vector parameter adjustment may be given to synthetic text in comparison to that of integer-replaced or original text. The weights may also be adjusted as the training progresses. The final trained word vectorization may thereafter be used for NLP (Step S306).

Where a GPU-based system is used, synthetic text may be vectorized until a sufficient amount of the actual text corpus is loaded into primary memory and then at that time, all processing threads may stop vectorization, i.e. stop constructing vectors, based on synthetic text and may be redirected to processing the actual text corpus so that processing of the actual text may be performed in parallel so as to preserve the SIMD/SIMT GPU characteristics.

In addition to the processing of the actual text corpus and the synthetic text, exemplary embodiments of the present invention may also perform vectorization on a corpus of original text that is permanently written into main memory, or a high-speed ROM so that all three textual sources may be processed at substantially the same time.

In any of the schemes described above, vector learning on the actual text corpus may be afforded more weight than the vector learning performed on the synthetic text. The extent of this weighing may be adjustable based on the needs of the use.

As described above, the text statistics may include an indication of how likely a given single word is to follow another single word. This simple example of text statistics may be easily and quickly used to generate synthetic text with minimal memory overhead. However, to increase accuracy, the text statistics may also include the probability of a given word following a particular word pair <w1,w2>, or more generally, a particular vector <w1, . . . , wu> of words. While this approach may increase accuracy, it may also increase memory overhead and accordingly, exemplary embodiments of the present invention may allow for the selection of the magnitude of the value u so that additional accuracy may be achieved, where desired, by selecting a high value u (e.g. 3 or more) and additional speed and computational efficiency may be achieved, where desired, by selecting a low value u (e.g. 2).

Exemplary embodiments of the present invention may also provide additional techniques for generating more sophisticated synthetic text. For example, choosing a word as a sentence start word can use the method of word2vec for choosing a negative example from a Unigram distribution (we can also use the same power of ¾ technique to offset highly occurring words).

In scanning the text corpus to derive M, a hash table HP may be employed. The hash table may have entries (key, value), and may have the form key=(word1,word2) value=count. The hash function associated with HP is applied to the key in order to locate the entry in HP for the key. Here word1 and word2 may be the ordinal numbers of sentence words such that word2 immediately follows word1, and count is the number of times the sequence of words word1 word2 has been thus far encountered in the original text. So, as the original text is scanned, HP is populated and occasionally entries are updated.

Following the initialization pass over the original text, an array Aw may be constructed for each word w. The array Aw may enable the efficient selection of the next word to be generated. Various Aw's may be constructed by making a single pass over HP. For an HP entry (a,ai),counti the array Aw may be extended with counti many entries and write ai in these extending entries. The end result may be that for each word w, Aw has the general form (assume k different ai's):

a1 . . . a1a2 . . . a2a3 . . . a3a4 . . . a4 . . . ak−1 . . . ak−1ak . . . ak where ai is repeated counti times for i=1, . . . , k, ai appears counti times where (w,ai),counti is an entry in HP. Accordingly, the next word may be quickly selected with the appropriate probability by randomly selecting a number q in the range [1,#w] and selecting Aw[q] as the ordinal number of the next output word.

For some words w, #w is very large and it may be prohibitive to allow a size #w Aw array. There are a number of possible remedies. One is to put an upper bound on the size of Aw, say 1000, and adjust word repetitions linearly.

Another method is to keep with each word1 an array of pairs of the form (word2, count2) where count2 is the number of times word2 follows word1 in the text. Let COUNT1 be the sum of all these count2 entries for words following word1 in the text. At generation time, given word1, a number R between 1 and COUNT1 may be randomly chosen and this array may be scanned until the sum of count2 entries exceeds R, and then generate the currently scanned word2. If instead of keeping individual counts in the array, partial sums are stored up to this point, the scan can be replaced with binary search.

According to some exemplary embodiments of the present invention, in addition to matrix M, a matrix M' may also be maintained. The (i,j) entry of M', M'[i][j], may contain the number of occurrences in the original text of the following event E: "word #i appears and then one intervening word #x, and immediately following word #x, word #j appears". The matrix M' may also be constructed during a single initializing pass over the data. The additional statistics encoded in M' may allow for the generation of synthetic text that better mimics the statistics of the original text. This may be done as follows:

Supposing word #i, word#j have been generated and now the next word to be generated is to be determined. The probability of a word w appearing next after the sequence word#u word#v is approximated as:

(M[u][w]/Sum on all words z(M[u][z]))*(M'[v][w]/Sum on all words z(M'[v][z]))

This probability may be enforced in the generated text via a procedure, for example, as follows:

Arrays may be constructed for both M and M', as previously described—each word w, the array Aw or A'w (for M') may have the general form:

a1 . . . a1a2 . . . a2a3 . . . a3a4 . . . a4 . . . ak−1 . . . ak−1ak . . . ak

To generate the next word, a word #u may be obtained from Aw and a word #v may be obtained from A'w. If #u=#v, word #u=#v may be output, otherwise, an additional try is made, up to S times, where S is a parameter (e.g. set as 5). Where S trials have not produced a common value, a number x between 0 and 1 may be randomly obtained. If x<m (where m is a parameter, e.g. set as 0.6), one more word selection may be made according to Aw and the word may be generated, otherwise, one more word selection may be made according to A'w and the word may be generated. Thus, priority is given to more 'recent' information, namely word #j.

For implementation in a GPU environment, S may be chosen to be higher than for a CPU based system; whereas the next word generation takes longer, the massive parallelism masks this cost.

This method may be generalized to include A"w ("skip 2" information) where here the agreed upon common value is generated by randomly choosing from Aw, A'w and A"w. Here, A' may be denoted as A'1w and A"w may be denoted as A'2w. Having 3 structures increases the cost of generation but also generates a more high fidelity text. Structures A'rw may be added and "skip r" may be encoded for an arbitrary r. For GPUs, a higher r may be used as, again, the increased cost in generating the next word is masked by the massive parallelism.

The case of Aw and A"w may be treated with generalization for A'rw. The Aw and A'w structures may be adjusted so that they only contain words that are common (if a word that appears in one and not the other is chosen, this generation attempt will fail). This can be done by adjusting the arrays Aw and A'w by deleting the strips corresponding to words that appear only in Aw and not in A'w (or vice versa) and contracting the arrays. To make this speedy, a structure (can be a list, sorted list, search tree, hash table . . . ) that helps to quickly determine if a word appears in Aw or A'w may be used. Observe that contracting arrays has an associated cost but it makes the expected sequence of trials for finding a common value shorter.

As discussed above, exemplary embodiments of the present invention may collect the number of occurrences of word sequences (w1, . . . , wn), also known as a n-tuple of words, for a particular n. For example, suppose n=4, and sequences (ice, water, on, table) with say 5 occurrences in the text, (ice, water, on, bar) with 2 occurrences, (john, went, to, his) with 3 occurrences, and (john, went, to, school) with 1 occurrence, and so on.

For each (n−1)-prefix all the n'th words and their count as well as the total count of these individual word counts may be extracted. During generation, the next word may be generated based on the current (n−1) word sequence, where each possible continuation is generated with probability (its count)/(total count of possible continuations).

Continuing the example, and assuming these are the only sequences starting with (ice, water, on) and (john, went, to), there will be: (ice, water, on) with fourth word=table with count=5 and word=bar with count=2, total=5+2=7; (john, went, to) with fourth word=his with count=3 and word=school with count=1, total=3+1=4.

When generating text, at each point in time, a sequence of three words may be used and the fourth word may be determined. For example, suppose the current tuple at hand is (john, went, to). Then, with probability ¾ the word "his" may be generated as the next word and with probability ¼ the word "school" will be generated. Where the word "school" is generated, a new sequence will be (went, to, school) and based on this sequence, the next word will be generated. The larger n gets, the closer the resulting generated text is to the original text corpus in terms of potential learning quality, to the original text. On the other hand, the larger n is the more n-tuples of words we have and their memory consumption may be as large as or even larger than the text corpus file itself, larger than its integer sequence representation and other compression products.

Accordingly, an efficient structure that enables word generation may be used. Here are a few possibilities for such efficient structures, others may be adapted from data structures known in the art.

Hash table for (n−1) word tuples: Based on the n−1 words a hash function may be used to compute a hash value. Once the entry in the table is located, it points to a sequential storage area in which the possible continuation words are arranges in sequence, each with the sum of the counts of all the words preceding it in the sequence (with respect to continuation based on this (n−1)-tuple). To determine the next word a random number R is generated in the range 0-(sum of counts −1). This sequential storage may be explored linearly or using binary search, to locate the first entry whose recorded sum of counts is larger than R. Here, to resolve hashing conflicts, the original identifiers of the (n−1) words in the tuple may be maintained with the hash table entry of the tuple. This may result in a potentially high storage requirement. Note that if following the completion of a key insertion, the resulting hash entry was not accessed at all later on during insertions, these original identifiers need not be retained as a search for these identifiers will "naturally" stop at the said entry.

The next approach may be similar to the approach discussed above, hash table for (n−1) word tuples, but here the sequential storage area contains occurrences of unique identifiers of possible next words. The number of occurrences in the storage area of a word may be related, e.g. proportional, to its number of occurrences after the (n−1)-tuple in the original text.

The next approach may be similar to the approach discussed above, hash table for (n−1) word tuples, but without resolving hash conflicts. So, if two word sequences 'hit' the same hash entry they are 'unified'. In terms of continuation words for generation, the potential continuation words of all (n−1) word tuples that hit this entry in the hash table may be kept along with their counts and the sum of their counts. So, when generating and starting with (n−1) words, their hash value may be calculated, the entry in the table may be located, based on its continuation words and their counts, the next word may be probabilistically determined (from which we know the 'new' (n−1) word sequence). To make this scheme mimic the statistics of the original text, the hash table employed may be as large as practicable to limit hash collisions, and provide a high quality hash function.

The next approach starts with a table, an array, with the i'th entry identified with word number i, for each word in the vocabulary. This table contains roots of trees as follows. Each of the edges out of an entry are connected to possible second words, and each of these edges are connected to possible third words, and so on. From the leaves of this tree various attributes may be recorded: (a) possible continuations and their counts, and (b) the sum of these counts. This structure may then enable probabilistically generating the next word given the 'current' (n−1) words.

The next approach extends the aforementioned method by utilizing a parameter k, typically k=5. If a n-tuple (w1, . . . , w(n−1), wn) occurs less than k times and there is also some other n-tuple (w1, . . . , w(n−1), w'n) that occurs k or more times, then the first tuple (w1, . . . , w(n−1), wn) may be ignored. If all n-tuples starting with (w1, . . . , w(n−1)) occur less than k times, only one is retained and the other are ignored. Other variations are possible, for example, retain a subset of these less than k occurring n-tuples for further processing, especially if the n'th word has few occurrences.

The next approach resembles the previously described table with roots of trees approach but uses less memory. This approach may be particularly useful for large text files. We illustrate this method is described herein with a particular use of 32-bits computer words as an example. We use word numbers or identifiers (IDs) may be stored in 19 bits to store word numbers, or identifiers (IDs), 12 bits may be used for storing a count, one delimiter bit may also be used. The starting point is a table accessed via the number, ID, of a word. Each word entry points to an array in which all n-tuples starting with this word are encoded. We illustrate this construction by way of an example. Suppose we would like to encode how to generate the fourth word given 3 words that were just generated (the case n=4), the following process may be used. For simplicity assume that the 4-word sequences starting with word a that appears in the text (where use a, b, c and d are used to denote words) are:

1: abcd—4times
2: abce—2 times
3: axce—2 times
4: axca—2 times
5: axbd—6 times
6: abxe—2 times
7: abxa—4 times
8: abxd—5 times The arrangement top level: an entry for word a points to the beginning of array A, which contains:

1: (0,0,b)
2: (1,0,x) the delimiter=1 says that there are no additional continuations after a, just b and x.
3: (0,0,c)
4: (1,0,x) the delimiter=1 means that after ab we can only have c or x.
5: (0,0,b)
6: (1,0,c) the delimiter=1 means that after ax we can only have b or c.
7: (0,4,d)
8: (1,2,e) the delimiter=1 means that after abc we can only have d or e.
9: (0,4,a)
10: (0,5,d)
11: (1,2,e) the delimiter=1 means that after abx we can only have a, d or e.
12: (1,6,d) the delimiter=1 means that after axb we can only have d.
13: (0,2,a)
14: (1,2,e) the delimiter=1 means that after axc we can only have a or e It may be observed that the counter field is unused in the first six encoding 32-bit words. These fields may be used to indicate where the continuation of the sequence of words is encoded in array A. The result is as follows:

1: (0,3,b)
2: (1,5,x) the delimiter=1 says that there are no additional continuations after a, just b and x.
3: (0,7,c)
4: (1,9,x) the delimiter=1 means that after ab there can only be c or x.
5: (0,12,b)
6: (1,13,c) the delimiter=1 means that after ax there can only be b or c.
7: (0,4,d)
8: (1,2,e) the delimiter=1 means that after abc there can only be d or e.
9: (0,4,a)
10: (0,5,d)
11: (1,2,e) the delimiter=1 means that after abx there can only be a, d or e.
12: (1,6,d) the delimiter=1 means that after axb there can only be d.
13: (0,2,a)
14: (1,1,e) the delimiter=1 means that after axc there can only be a or e.

Note that in the first six entries of A the counter has a different meaning than in the following 8. In case there are not enough counter bits to indicate the continuation location, the location can be determined by examining the delimiter bits. In general, the array may be partitioned into levels. The first level corresponds to 2nd words in a sequence, the second level to 3rd words in a sequence and so on. Within a level, the order corresponds to the order in the previous level. Each 'stretch' of continuation of a 'parent' in a previous level is delimited by the delimit bit. In doing so, there is sufficient information to determine all continuations. In the last level, the counters indicate number of occurrences. In case there are not enough bits, the counts may be uniformly scaled by, for example, dividing all counts by 2.

The array A is used to determine, given 3 words, for example a b x, which word should be generated next. By starting with a, the first 'stretch' may be scanned, locations 1 and 2 may be scanned, and b may be located in location 1. The counter=3 implies that c is searched for in the 'stretch' 3, 4; x is found in location 4. The counter=9 is an indication to continue in 'stretch' 9, 10, 11. The counts in this final 'stretch' of entries, 4 for a, 5 for d and 2 for e, are used to probabilistically determine the actual continuation word; for example the probability of e being generated next is 2/(2+4+5)=2/11. Generation can be done straightforwardly by scanning the last 'stretch' to determine the total sum (11 in this example) and then scanning again to determine where a probabilistic guess exceeds the cumulative sum up to that point divided by the total sum.

There are a number of variations on the method just explained via the extended example. For example, use more bits per entry (rather than 32 bits), for example 40 bits, which can be used to increase the vocabulary size that can be encoded and/or the range of the counters. Such an increase may also allow keeping cumulative occurrence values within 'stretches' at the lowest level which can speed up the probabilistic generation, this can be further sped-up by keeping the size of A which will enable binary search over the lowest 'stretch'. Another variation is increasing the number of levels as long sufficient memory is available, this has the effect of enhancing the fidelity of text generation.

The n-tuple based methods for text generation may accompanied with the following method for making the generated text closer to the real text. With each vocabulary word we keep a m-bit vector, initially all zero. For illustrating the method suppose n=3, that is, based on the last 2 generated words we generate the next one. While initially scanning the text, suppose we encounter the sequence of words a b c d. When encountering d, we hash its representation to the range 0-(m-1) and set the appropriate bit to 1. We operate similarly for all words encountered and the respective bit vectors of words that were encountered 3 steps beforehand. Now, during generation suppose the last 3 words generated were x y z. Based on (y,z) we probabilistically determine w as the next word. However, before outputting w, we check if the hash value of w in the range 0-(m-1), say k, is such that bit k of the m-bit vector of x is set to 1. If not, we know that in the original text w never appeared 3 places after x and we try to generate an alternative word, if possible. Observe that this scheme can be adjusted to arbitrary n and m. In addition one can keep more than one m-bit vector, for example, the second one 'looking ahead' (n+1) places.

There are significant advantages to using generated text. One important advantage is that the data structures used for generation are amenable, with relatively minor modifications, to incremental updating. This is especially important as new text is added to the corpus or in the case of continuously arriving streaming text.

Another advantage is the ability to attribute more importance to certain text fragments. This is done by artificially increasing their n-tuple counts, say by a factor w, thereby making them more dominant in the vectorization process. It is difficult to mimic this capability on real text without making it prohibitively long or modifying the internals of the vectorization tool.

An additional advantage is the ability to generate arbitrarily, and if desired repeatable, long text on demand in a parametrized way (by adjusting tuple counts) which may be useful in testing machine learning tools and in debugging them.

The next method uses compression (on original text or using integer representation of word). In one embodiment the text is partitioned into blocks. Each block is separately compressed. During vectorization, each processing element uses its compressed block(s) to generate the text incrementally and train concurrently to un-compressing the text.

Figure 4:
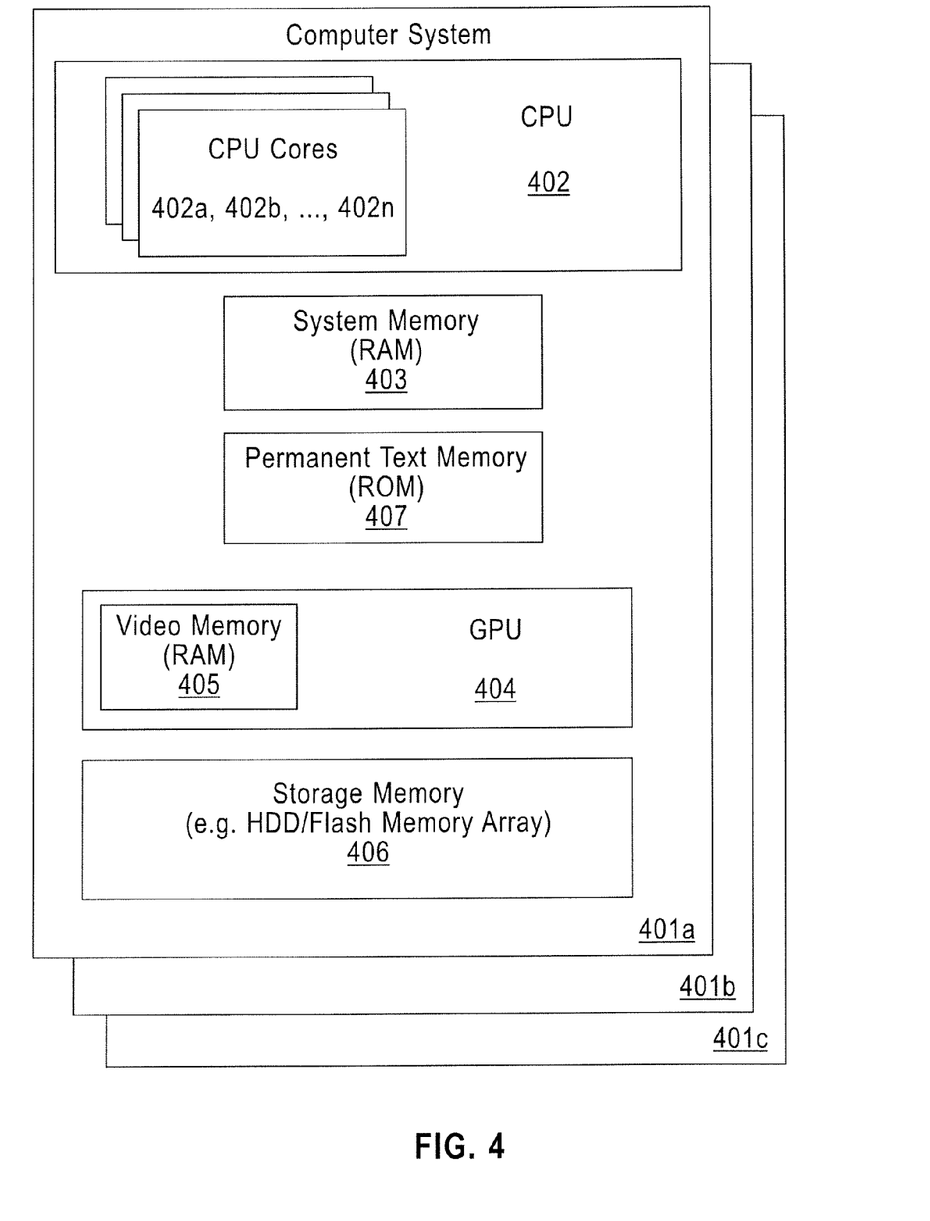
FIG. 4 is a schematic diagram illustrating a system for word vectorization in accordance with exemplary embodiments of the present invention.

As discussed above, exemplary embodiments of the present invention may be able to achieve greater operational efficiencies by minimizing I/Os associated with loading large text corpuses from storage memory to primary memory (e.g. RAM). FIG. 4 is a schematic diagram illustrating a system for word vectorization in accordance with exemplary embodiments of the present invention. The process for vectorization, as discussed above, may be performed on either a single computer system 401a or by a cluster of computer systems 401a, 401b, 401c, . . . in communication with each other over a computer network such as a local area network (LAN) or a wide area network (WAN) such as the Internet. The computer system(s) may have one or more CPUs 402 and each CPU 402 may have multiple cores 402a, 402b, . . . , 402n. The CPU 402 may have access to a primary memory 403, which may be considered system memory (e.g. RAM). The primary memory 403 may be accessible by the CPU over a high-speed memory bus. The primary memory 403 may be the operational memory for the CPU 402. The computer system(s) may also include a storage memory 406, which may be, for example, a hard disk drive (HDD), a solid state drive (SSD), or an array of one or more HDD/SSD. The text corpus described above may initially be stored within the storage memory 406, particularly as the text corpus may be too large to fit into the system memory 403.

However, one or more of the CPU cores 402a, 402b, . . . , 402n may generate synthetic text, in accordance with the disclosure above, directly to the system memory 403 and perform vectorization on the synthetic text without having to read from the storage memory 406.

Similarly, the computer system(s) may include one or more graphics processing units (GPUs) 404 and the GPU 404 may be configured to generate synthetic text, in accordance with the disclosure above, and perform vectorization on the synthetic text without having to read text from the storage memory 406. While the GPU 404 may utilize the system memory 403 in this case, particularly where the GPU 404 utilizes shared memory, according to another approach, the GPU 404 utilizes its own video memory 405, which is high speed volatile memory, just like the system memory 403. In this case the synthetic text generation enabling data structures are stored in the video memory 405.

The computer system 401 may also include a high-speed memory 407 for storing "permanent" text, for example, as described above. This text may be permanent in so far as it is preloaded, converted to integers, and unlikely to be modified during operation. The CPU 402 may perform vectorization on this text in addition to performing vectorization on the actual text corpus and/or synthetic text. This permanent text memory 407 may be a ROM, may be a volatile memory that is programmed at startup of the computer system(s), or may be a high-speed non-volatile memory.

Figure 5:
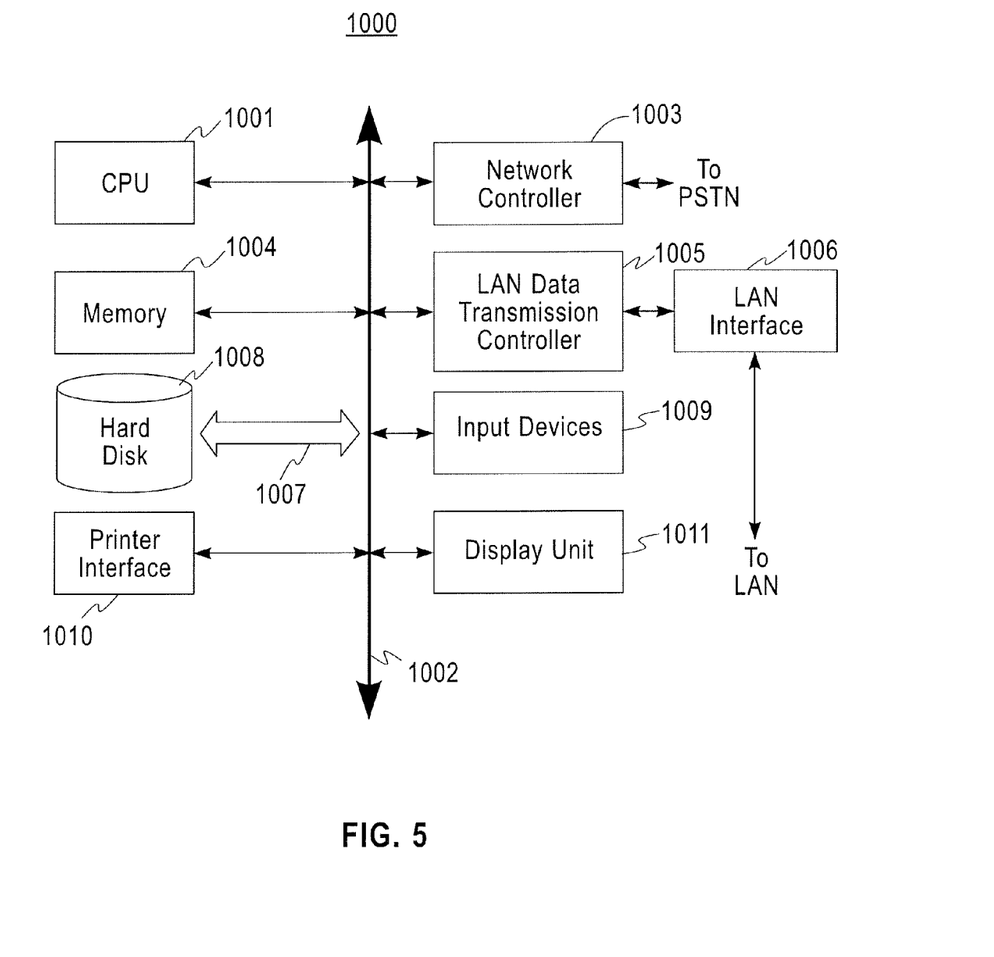
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A method for performing natural language processing, comprising:
   receiving a primary text file;
   scanning the received primary text file to determine a set of statistics related to a frequency at which various words of the primary text file follow other words of the primary text file;
   creating a probabilistic word generator, based on the determined set of statistics, that generates synthetic text exhibiting the determined set of statistics;
   generating synthetic text directly into a main memory of a computer system, the generated synthetic text including a plurality of sentences, each of which including a predetermined number of probabilistically selected words exhibiting the determined set of statistics, related to a frequency at which various words of the primary text file follow other words of the primary text file, using the created probabilistic word generator;
   performing word vectorization on the synthetic text, within the main memory of the computer system;
   using results of the performed vectorization to perform machine learning tasks; and
   using the machine learning tasks to perform natural language processing to interpret a subsequent text,
   wherein, in generating the synthetic text that is used to perform machine learning directly into the main memory, no text data is loaded into the main memory from a memory storage device.

2. The method of claim 1, wherein the machine learning tasks include natural language processing.

3. The method of claim 1, wherein word vectorization is performed on the synthetic text as each word or each group of words of the synthetic text is generated.

4. The method of claim 1, wherein receiving the primary text file includes storing the primary text file in a secondary storage that includes either a hard disk drive or a solid state drive.

5. The method of claim 1, wherein the set of statistics includes an indication of a frequency with which a second given word in the primary text file immediately follows a first given word in the primary text file.

6. The method of claim 1, wherein the set of statistics includes n-tuple statistics.

7. The method of claim 1, wherein the set of statistics includes an indication of a frequency with which a given word in the primary text file immediately follows a given sequence of words in the primary text file.

8. The method of claim 7, wherein the given sequence of words includes a sequence of two words.

9. The method of claim 7, wherein the given sequence of words includes a sequence of two, three, four, or five words.

10. The method of claim 1, wherein the probabilistic word generator generates synthetic text directly to a main memory.

11. The method of claim 1, wherein there are multiple instances of generating synthetic text and performing word vectorization on the synthetic text, running in parallel.

12. The method of claim 1, wherein vectorization is additionally performed in parallel on the primary text file and on generated text.

13. The method of claim 12, wherein generating synthetic text and performing word vectorization on the synthetic text are performed during periods in which text from the primary text file is loaded from storage memory into main memory for vectorization thereupon.

14. The method of claim 1, wherein after the primary text file is received, each word of the primary text file is replaced by a corresponding integer, the synthetic text is generated as a sequence of corresponding integers, rather than words, and word vectorization is performed on the sequence of corresponding integers.

15. The method of claim 1, wherein each sentence of the plurality of sentences of the synthetic text is generated, by the created probabilistic word generator, by probabilistically selecting a starting word according to a frequency of word use, which is a first statistic of the determined set of statistics, and then generating a sequence of successive words thereafter by probabilistically selecting each word thereof, according to a frequency by which one word follows another, which is a second statistic of the determined set of statistics.

16. A method for performing natural language processing, comprising:
   receiving a primary text file;
   scanning the received primary text file to determine a set of statistics related to a frequency at which various words of the primary text file follow other words of the primary text file;
   creating a probabilistic word generator, based on the determined set of statistics, that generates synthetic text exhibiting the determined set of statistics;
   generating synthetic text directly into a main memory of a computer system, the generated synthetic text exhibiting the determined set of statistics using the created probabilistic word generator;
   performing word vectorization on the synthetic text, within the main memory of the computer system;
   using results of the performed vectorization to perform machine learning tasks; and
   using the machine learning tasks to perform natural language processing to interpret a subsequent text,
   wherein the set of statistics includes n-tuple statistics,
   wherein the generating of the synthetic text comprises generating a next word by taking into account statistics for the word generated n-words prior, within the generated synthetic text, or the word generated another fixed distance prior, within the generated synthetic text, by using m-bit vectors and hashing, and
   wherein the steps of generating synthetic text, performing word vectorization thereon, and using the results of the vectorization to perform machine learning tasks are implemented as multi-threaded processes so that a plurality of instances of generating synthetic text and vectorizing/performing machine learning are executed in parallel.

17. A method for performing natural language processing, comprising:
- receiving a primary text file;
- scanning the received primary text file to determine a set of statistics related to a frequency at which various words of the primary text file follow other words of the primary text file;
- creating a probabilistic word generator, based on the determined set of statistics, that generates synthetic text exhibiting the determined set of statistics;
- generating synthetic text directly into a main memory of a computer system, the generated synthetic text exhibiting the determined set of statistics using the created probabilistic word generator;
- performing word vectorization on the synthetic text, within the main memory of the computer system;
- using results of the performed vectorization to perform machine learning tasks; and
- using the machine learning tasks to perform natural language processing to interpret a subsequent text,
- wherein vectorization is additionally performed in parallel on the primary text file and on generated text, and
- wherein different weights are afforded to the vectorization of the primary text file and the generated text in providing adjustments to vector parameters.

18. The method of claim 17, wherein the different weights are adjusted as the vectorization progresses.

19. A method for performing natural language processing, comprising:
- receiving a primary text file;
- scanning the received primary text file to determine a set of statistics related to a frequency at which various words of the primary text file follow other words of the primary text file;
- creating a probabilistic word generator, based on the determined set of statistics, that generates synthetic text exhibiting the determined set of statistics;
- generating synthetic text directly into a main memory of a computer system, the generated synthetic text exhibiting the determined set of statistics using the created probabilistic word generator;
- performing word vectorization on the synthetic text, within the main memory of the computer system;
- using results of the performed vectorization to perform machine learning tasks; and
- using the machine learning tasks to perform natural language processing to interpret a subsequent text,
- wherein in performing vectorization, greater weight is afforded to certain text fragments by artificially increasing their n-tuple counts to make them more dominant in the vectorization process.

* * * * *